(12) United States Patent  (10) Patent No.: US 8,017,283 B2
Martinent et al.  (45) Date of Patent: Sep. 13, 2011

(54) ELECTRODE FOR ALKALI FUEL CELL AND METHOD FOR MAKING A FUEL CELL INCLUDING AT LEAST ONE STEP OF MAKING SUCH AN ELECTRODE

(75) Inventors: Audrey Martinent, Grenoble (FR);
Jean-Yves Laurent, Domene (FR); Max Perrin, Le Fontanil Cornillon (FR);
Mauricio Schieda, Bahia Blanca (AR);
Jean Durand, Montpellier (FR);
Stephanie Roualdes, Montpellier (FR)

(73) Assignees: Commissariat a l'Energie Atomique, Paris (FR); Universite Montpellier II, Montpellier (FR); Centre National de la Recherche Scientifique, Paris (FR)

( * ) Notice: Subject to any disclaimer, the term of this patent is extended or adjusted under 35 U.S.C. 154(b) by 795 days.

(21) Appl. No.: 12/083,229

(22) PCT Filed: Oct. 18, 2006

(86) PCT No.: PCT/FR2006/002340
§ 371 (c)(1),
(2), (4) Date: Apr. 8, 2008

(87) PCT Pub. No.: WO2007/045763
PCT Pub. Date: Apr. 26, 2007

(65) Prior Publication Data
US 2009/0042092 A1 Feb. 12, 2009

(30) Foreign Application Priority Data
Oct. 19, 2005 (FR) ...................................... 05 10658

(51) Int. Cl.
*H01M 4/86* (2006.01)

(52) U.S. Cl. ......... 429/530; 429/532; 429/535; 427/115
(58) Field of Classification Search ........... 429/400–535
See application file for complete search history.

(56) References Cited

U.S. PATENT DOCUMENTS

| 3,438,815 | A | 4/1969 | Giner |
| 5,518,831 | A | 5/1996 | Tou et al. |
| 5,750,013 | A | 5/1998 | Lin |
| 2002/0068213 | A1* | 6/2002 | Kaiser et al. ................... 429/40 |
| 2004/0028992 | A1 | 2/2004 | Jaouen |

(Continued)

FOREIGN PATENT DOCUMENTS

FR 2 863 777 A1 6/2005

(Continued)

*Primary Examiner* — Basia Ridley
*Assistant Examiner* — James Lee
(74) *Attorney, Agent, or Firm* — Oliff & Berridge, PLC

(57) ABSTRACT

An electrode for an alkali fuel cell comprises an active layer formed by a bilayer or by a stack of a plurality of bilayers. Each bilayer is composed of a catalytic layer comprising catalyst particles of nanometric size and of a porous layer comprising two opposite faces one of which is in contact with the catalytic layer. The porous layer is made from a porous composite material comprising a hydroxide ion conducting polymer matrix in which a metallic lattice is formed constituting a plurality of electronically conducting paths connecting the two opposite faces of the porous layer. Advantageously, fabrication of such an electrode is obtained by successively performing vacuum deposition of the catalyst particles and vacuum co-deposition of the hydroxide ion conducting polymer and of the metal on a free surface of a support.

16 Claims, 1 Drawing Sheet

U.S. PATENT DOCUMENTS

* cited by examiner

2004/0157101 A1   8/2004  Smedley
2005/0095479 A1*  5/2005  Mardilovich et al. ........... 429/30
2007/0128500 A1   6/2007  Marsacq et al.

FOREIGN PATENT DOCUMENTS

| WO | WO 93/03506 A1   | 2/1993 |
| WO | WO 2005/069413 A1 | 7/2005 |

ELECTRODE FOR ALKALI FUEL CELL AND METHOD FOR MAKING A FUEL CELL INCLUDING AT LEAST ONE STEP OF MAKING SUCH AN ELECTRODE

BACKGROUND OF THE INVENTION

The invention relates to an electrode for an alkali fuel cell comprising at least an active layer that is an electronic conductor, conducting hydroxide ions, and catalytic.

The invention also relates to a method for making an alkali fuel cell including at least one step of making such an electrode.

STATE OF THE ART

Known Alkali Fuel Cells, also referred to as AFC, are generally formed by two electrodes and a liquid or solid electrolyte exchanging or conducting hydroxide ions $OH^-$.

Patent Application WO-A-2005/069413 describes for example an alkali fuel cell comprising a solid stack formed by a first electrode, a solid conducting hydroxide ions membrane and a second electrode. Each electrode of the stack comprises at least an active layer in contact with the solid membrane. Each active layer presents electronic conduction properties, hydroxide ion conduction properties and catalytic properties for the electrochemical reaction or reactions taking place inside the alkali fuel cell. The material constituting the active layer therefore comprises at least a catalytic element, an electronic conducting element and a hydroxide ion conducting element. The hydroxide ion conducting element is formed by a polymer with a styrenic pattern comprising a quaternary ammonium function with which a hydroxide ion is associated. The efficiency of an electrode comprising such an active layer is not however optimal and the active layer is not easy to implement. The active layer preparation techniques are not in fact suitable for industrial manufacturing.

It has been proposed to produce fuel cells and/or electrodes used in fuel cells by techniques originating from microelectronics, such as vacuum deposition techniques.

U.S. Pat. No. 5,518,831 thus describes formation by vacuum deposition of an electrocatalytic structure able to be used in a fuel cell such as an Electrode-Membrane-Electrode stack fuel cell, with a perfluorosulphonic acid-based electrolytic membrane. The electrocatalytic structure is formed by a polysiloxane ($SiO_xC_yH_z$) polymer matrix in which discrete and isolated particles of catalytic material, for example platinum, are dispersed. The electrocatalytic structure can thereby be obtained by repeating a cycle of three deposition steps several times. The cycle then successively comprises production of a first polymer film by plasma enhanced chemical vapor deposition (PECVD), followed by deposition of the catalytic material in the form of discrete particles and PECVD of a second polymer film so as to cover said particles. The particles of catalytic material can also be deposited in a first step. In this case, the electrocatalytic structure is produced by repeating a cycle of two successive steps respectively corresponding to deposition of the catalytic material particles followed by PECVD of a polymer film designed to cover said particles. Deposition of the catalytic material particles is for example performed by sputtering or evaporation. Repeating a cycle of two or three steps always leads to formation of a single layer formed by a polymer matrix in which discrete and isolated particles of catalytic material are dispersed. The particular distribution of the particles within the polymer matrix and the composite material obtained do not however enable an active electrode layer ensuring optimal operation of an alkali fuel cell to be obtained. Although it has satisfactory catalytic properties, the active electrode layer does not in fact contain any hydroxide ion conducting elements and the electronic conduction properties are limited.

Likewise, U.S. Pat. No. 5,750,013 proposes using deposition techniques originating from microelectronics to achieve a fuel cell such as a solid membrane fuel cell with a proton exchanging polymer base. The fuel cell is produced by vacuum deposition of a plurality of thin layers successively forming a first electrode, a proton exchanging polymer membrane for example made of Nafion®, and a second electrode. Each of the electrodes is formed by a catalytic active layer comprising an alternation of two superposed layers, respectively composed of a layer of metallic particles having a size comprised between 1 nm and 10 nm and a porous conducting layer. The layer of metallic particles is obtained by plasma sputtering. The porous conducting layer is achieved by chemical vapor deposition from a hydrocarbide type precursor so as to obtain a porous carbonaceous layer ensuring diffusion of gases and electrical conduction. The active layer thus formed can not however ensure optimal operation of alkali fuel cells. The active layer is in fact not ionically conducting and even less hydroxide ion conducting.

OBJECT OF THE INVENTION

One object of the invention is to provide an electrode for an alkali fuel cell that presents an optimal efficiency and is easy to implement. More particularly, one object of the invention is to provide an electrode for an alkali fuel cell comprising at least an active layer which presents both improved electronic conduction properties, improved hydroxide ion conduction properties and improved catalytic properties, while at the same time being easy to implement.

According to the invention, this object is achieved by the appended claims. More particularly, this object is achieved by the fact that the active layer is formed by a bilayer or a stack of a plurality of bilayers, each bilayer being composed of:
  a catalytic layer comprising particles of catalyst of nanometric size,
  and a porous layer comprising two opposite faces one of which is in contact with the catalytic layer, the porous layer being formed by a porous composite material comprising a hydroxide ion conducting polymer matrix in which a metallic lattice constituting a plurality of electronically conducting paths connecting the two opposite faces of the porous layer is formed.

It is a further object of the invention to provide a method for manufacturing an alkali fuel cell comprising at least one step of fabrication of such an electrode, that is easy to implement and, more particularly, is suitable for industrial manufacturing.

According to the invention, this object is achieved by the fact that the fabrication step of electrode comprises at least vacuum deposition of the active layer on a free surface of a support, the catalytic layer of each bilayer being formed by vacuum deposition of catalyst particles of nanometric size and the porous layer being formed by vacuum co-deposition of a hydroxide ion conducting polymer and a metal.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
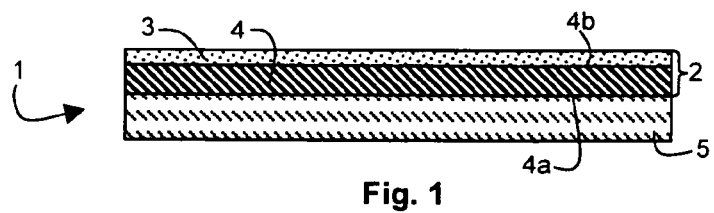
FIG. 1 schematically represents a cross-section of a first particular embodiment of an electrode according to the invention.
Figure 2:
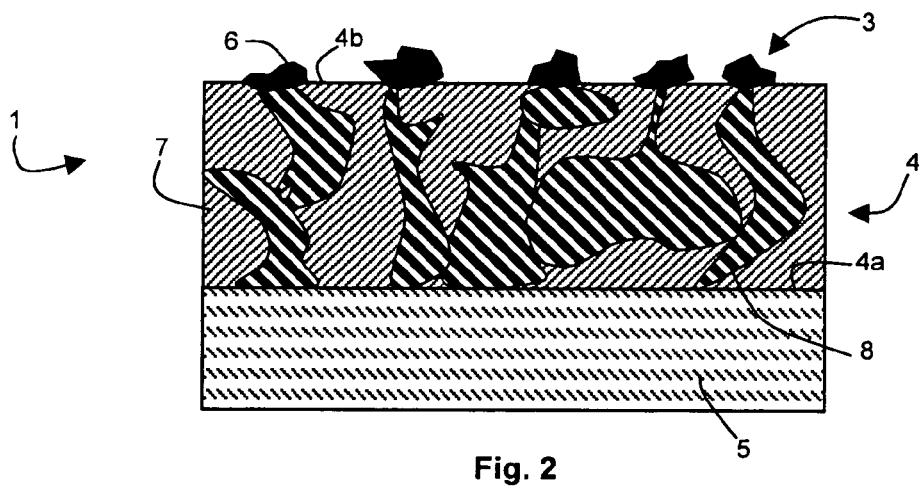
FIG. 2 schematically represents a cross-section of an enlarged part of the active layer of the electrode according to FIG. 1.
Figure 3:
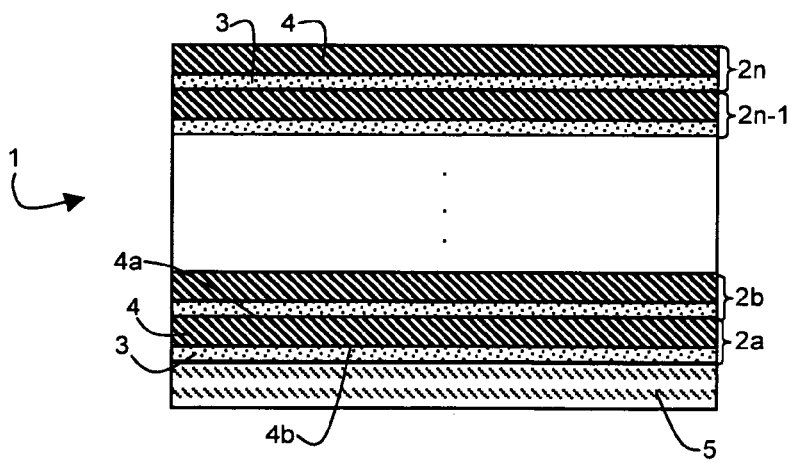
FIG. 3 schematically represents a cross-section of a second particular embodiment of an electrode according to the invention.

As represented in FIGS. 1 to 3, an electrode 1 for an alkali fuel cell comprises an active layer conducting electrons and hydroxide ions and being catalytic for an electrochemical reaction or reactions to take place in the alkali fuel cell.

The active layer is formed by a bilayer 2, i.e. by a thin film made up of two distinct superposed layers, or by a stack of a plurality of bilayers $2a, \ldots, 2n$, i.e. by a stack formed by an alternation of two distinct superposed thin layers. Each bilayer $2, 2a, \ldots, 2n$ is therefore composed of a catalytic layer 3 and a porous layer 4 comprising two opposite faces $4a$ and $4b$ one of which is in contact with the catalytic layer 3.

Furthermore, the active layer can be arranged on an additional layer 5 that is preferably porous and electronically conducting. In this case, the first layer arranged on additional layer 5 can be either a porous layer 4 or a catalytic layer 3. Thus, in FIGS. 1 and 2, porous layer 4 of bilayer 2 is in contact with additional layer 5 via its face $4a$. In FIG. 3 representing a stack of a number n of bilayers $2a, \ldots, 2n$, additional layer 5 is in contact with catalytic layer 3 of first bilayer $2a$ of the stack.

Catalytic layer 3 comprises catalyst particles of nanometric size. More particularly, as represented in FIG. 2, catalytic layer 3 is formed by catalyst particles 6. Catalytic layer 3 preferably has a thickness comprised between 2 nm and 50 nm and more particularly between 5 nm and 10 nm. The catalyst is preferably selected from platinum, a platinum and ruthenium based alloy, silver and nickel.

As represented in FIG. 2, porous layer 4 is formed by a porous composite material comprising a hydroxide ion conducting polymer matrix 7 and metal particles 8. The porosity of layer 4 can be optimized by the use of a pore forming agent introduced during fabrication and then eliminated. The agent can for example be a siloxane. The porosity of layer 4 therefore enables gaseous or liquid species to pass through porous layer 4, but also through the whole of the active layer, these species being designed to be oxidized or reduced during operation of the alkali fuel cell. Porous layer 4 preferably has a thickness comprised between 50 nm and 1000 nm and advantageously comprised between 100 nm and 200 nm.

The presence of a hydroxide ion conducting polymer in porous layer 4 thus ensures transportation and therefore conduction of the hydroxide ions from the catalytic sites formed by catalyst particles 6 or to said catalytic sites. The hydroxide ion conduction capacity is more particularly ensured in the polymer by a hydroxide ion exchange function, for example chosen from the quaternary ammonium function, the quaternary phosphonium function and the tertiary sulphonium function. The polymer is for example obtained by plasma deposition from a precursor of an anion exchange function such as an unsaturated amine, for example tri-allylamine or allylamine in which the amine function is replaced by a quaternary ammonium function.

Metal particles 8 form a percolating metallic lattice in matrix 7, i.e. a metallic lattice constituting a plurality of electronically conducting paths connecting the two opposite faces $4a$ and $4b$ of porous layer 4. The metal constituting the metallic lattice is preferably chosen from gold and silver.

Moreover, as illustrated in FIG. 2, catalyst particles 6 are preferably in contact with both polymer matrix 7 and metal particles 8, thereby forming triple points where the electrochemical reaction or reactions take place. The presence of triple points increases the catalytic efficiency of the active layer thereby enabling a particularly efficient electrode to be obtained for use in an alkali fuel cell. The fact that the active layer presents a particular structure in the form of one or more bilayers also means that the quantity of catalyst necessary for optimal operation of the alkali fuel cell can be reduced. This also enables the active surface of said active layer to be increased and improves its electronic conductivity and hydroxide ion conductivity. Lastly, it is easy to implement, in particular due to deposition techniques originating from microelectronics such as vacuum deposition techniques.

A fuel cell electrode according to the invention can in fact be produced by at least one vacuum deposition step of the active layer on a free surface of a support. Catalytic layer 3 of each bilayer $2, 2a, \ldots, 2n$ is therefore formed by vacuum deposition of catalyst particles 6. Porous layer 4 of each bilayer $2, 2a, \ldots, 2n$ is formed by vacuum co-deposition both of the hydroxide ion conducting polymer and of the metal designed to form metal particles 8.

More particularly, deposition of catalytic layer 3 of each bilayer $2, 2a, \ldots, 2n$ can for example be achieved by chemical vapor deposition from a metallo-organic precursor (MOCVD) or by electrodeposition or chemical reduction of a salt containing the catalyst, for example by electroreduction of $H_2PtCl_6$ to obtain a platinum catalytic layer. Advantageously, deposition of catalyst particles 6 is performed by vacuum sputtering, preferably by magnetron RF sputtering. The deposition conditions are more particularly controlled so as to obtain deposition of catalyst particles 8 of nanometric size separated from one another.

Co-deposition of porous layer 4 can be achieved by simultaneously performing plasma enhanced chemical vapor deposition (PECVD) to achieve hydroxide ion conducting polymer matrix 7 and deposition by vacuum evaporation of metal particles 8. The deposition conditions are more particularly determined so as to obtain a porous composite material comprising hydroxide ion conducting polymer matrix 7 in which the percolating metallic lattice is formed. In addition, PECVD of the polymer is more particularly performed from a precursor generating hydroxide ion exchange functions such as quaternary ammonium, quaternary phosphonium or tertiary sulphonium functions.

According to a first particular embodiment, an electrode for a fuel cell such as the one represented in FIG. 3 is for example produced by successively depositing n bilayers $2a$ to $2n$ on the free surface of an additional layer 5 arranged in a deposition chamber. The additional layer is for example a carbon paper support and it is preferably previously cleaned with isopropylic alcohol and then dried in argon. The deposition chamber thus comprises a sputtering target fixed onto an electrode equipped with a magnetic field generator to perform deposition of catalytic layers 3 and an evaporation source to form metal particles 8 of the porous composite material.

Thus, in a first step, argon gas is introduced into the chamber and the pressure is maintained at $10^{-2}$ Torr. A plasma is generated by applying a high electric potential or a high frequency to the electrode associated to the sputtering target.

This causes deposition of catalyst particles 6 on additional layer 5 and therefore formation of a first catalytic layer 3.

The deposition chamber is placed in a vacuum, in a second step, and a precursor of the hydroxide ion conducting polymer and the metal vapors are introduced into the chamber. The precursor polymer is for example an unsaturated amine, for example tri-allylamine or allylamine, in which the amine function is replaced by a quaternary ammonium function. A plasma is then generated by applying a high electric potential or a high frequency to the electrode so as to perform co-deposition of the porous composite material, thereby forming a first porous layer 4 on first catalytic layer 3. The first catalytic layer 3 and the first porous layer 4 thus form first bilayer 2a arranged on additional layer 5.

The two successive steps enabling first bilayer 2a to be produced are then repeated several times so as to form the stack of n bilayers.

Moreover, the active layer formed in this way can be subjected to chemical treatment optimizing the number of functions ensuring hydroxide ion conduction. For quaternary ammonium functions, the active layer can be treated with $CH_3I$.

According to a second particular embodiment, a stack of ten bilayers 2 was produced by repeating a cycle of two successive steps, respectively of magnetron RF sputtering and vacuum co-deposition, ten times. The first step of magnetron RF sputtering is performed by means of a platinum target to form a catalytic layer composed of platinum particles of nanometric size. The current intensity and voltage applied during deposition are respectively 20 mA and 1.5 kV, the argon pressure inside the chamber is $5*10^{-3}$ mbar, and the deposition time is 20 seconds. The second step of co-deposition is performed simultaneously by evaporation of a gold filament by making a current flow in said filament and introducing vapors of a precursor of the hydroxide ion exchanging polymer into the chamber. A plasma is generated by applying continuous RF waves to perform co-deposition. The pressure in the chamber is 0.8 mbar, the power is 50W, and the co-deposition time is 5 minutes. The chamber is then cleared to be ready for another deposition cycle. When the ten cycles have been performed, the active layer obtained can be treated chemically to optimize the number of hydroxide ion functions.

Fabrication of an electrode according to the invention presents the advantage of being easy to implement and of being able to be performed in one and the same deposition chamber, which makes it particularly suitable for industrial applications.

Figure 4:
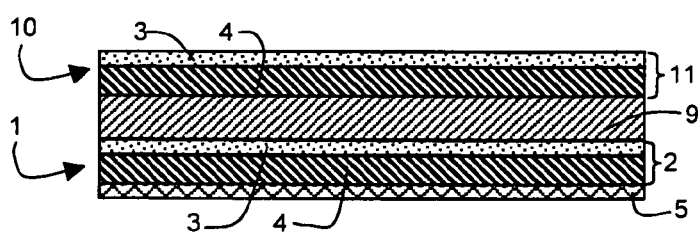
FIG. 4 schematically represents a cross-section of a fuel cell comprising two electrodes according to the invention.

Moreover, fabrication of an electrode according to the invention can be incorporated in a global alkali fuel cell fabrication process. This then enables an alkali fuel cell to be produced simply, quickly and in industrial manner. An alkali fuel cell as represented in FIG. 4 can be produced by successively depositing a first electrode 1, an electrolytic membrane 9 in the form of a non-porous thin layer and a second electrode 10 on the free surface of an additional layer 5. The first and second electrodes 1 and 10 represented in FIG. 4 respectively comprise first and second bilayers 2 and 11 each comprising a porous layer 4 and a catalytic layer 3.

In this way, once first electrode 1 has been deposited on the free surface of additional layer 5 by means of a fabrication step as described above, electrolytic membrane 9 is deposited by a vacuum deposition step on the free surface of first electrode 1. In FIG. 4, the free surface of first electrode 1 corresponds to the free surface of catalytic layer 3, as first bilayer 2 is produced by successively depositing porous layer 4 and then catalytic layer 3 on additional layer 5. A second electrode 10 can then be deposited on the free surface of electrolytic membrane 9 under the same conditions as the first electrode. In FIG. 4, second electrode 10 is identical to first electrode 1, bilayer 11 of second electrode 10 being identical that of first electrode 1.

The order of the catalytic and porous layers in second bilayer 11 and the number of bilayers in second electrode 10 could however be different from those of first electrode 1.

Moreover the respective catalysts of the catalytic layers of first and second bilayers 2 and 11 and the respective polymers of the porous layers of first and second bilayers 2 and 11 can also be identical or different. In the same way, the electrolytic membrane in the form of a non-porous thin layer may comprise a hydroxide ion conducting polymer that is identical to or different from the polymers of the porous layers of the first and second electrodes. The electrolytic membrane can thus for example be produced from the same polymer precursor as the porous layers of the first and second electrodes, but with a different operating mode, so as to obtain a non-porous electrolytic membrane. This means that a fuel cell can then be produced simply and quickly in one and the same deposition chamber.

The invention claimed is:

1. An electrode for an alkali fuel cell comprising at least an active layer, conducting electrons and hydroxide ions and being catalytic, wherein the active layer is formed by a bilayer or by a stack of a plurality of bilayers, each bilayer being composed of:
   a catalytic layer consisting of catalyst particles of nanometric size, wherein the catalyst particles are in contact with both a hydroxide ion conducting polymer matrix and a metallic lattice, thereby forming triple points where the electrochemical reaction or reactions take place;
   and a porous layer comprising two opposite faces one of which is in contact with the catalytic layer, the porous layer being formed by a porous composite material comprising the hydroxide ion conducting polymer matrix in which the metallic lattice constituting a plurality of electronically conducting paths connecting the two opposite faces of the porous layer is formed.

2. The electrode according to claim 1, wherein the catalytic layer has a thickness of from 2 nm to 50 nm.

3. The electrode according to claim 1, wherein the porous layer has a thickness of from 50 nm to 1000 nm.

4. The electrode according to claim 1, wherein the hydroxide ion conducting polymer comprises at least a hydroxide ion exchange function selected from the group consisting of a quaternary ammonium function, a quaternary phosphonium function, and a tertiary sulphonium function.

5. The electrode according to claim 1, wherein the catalyst is selected from the group consisting of platinum, a platinum and ruthenium based alloy, silver, and nickel.

6. The electrode according to claim 1, wherein the metal constituting the metallic lattice of the porous composite material is selected from silver and gold.

7. The electrode according to claim 1, comprising an additional layer on which the active layer is arranged.

8. A method for producing an alkali fuel cell comprising at least one fabrication step of an electrode according to claim 1, wherein the fabrication step of the electrode comprises at least vacuum deposition of the active layer on a free surface of a support, the catalytic layer of each bilayer being formed by vacuum deposition of catalyst particles of nanometric size and the porous layer being formed by vacuum co-deposition of a hydroxide ion conducting polymer and of a metal.

9. The method according to claim 8, wherein a plurality of bilayers is successively deposited on said free surface of the support so as to form the stack constituting the active layer.

10. The method according to claim 8, wherein deposition of the catalytic layer is performed by vacuum sputtering.

11. The method according to claim 8, wherein co-deposition of the porous layer is performed simultaneously by plasma enhanced chemical vapor deposition of the hydroxide ion conducting polymer and by evaporation of the metal.

12. The method according to claim 8, wherein vacuum deposition of the active layer on a free surface of a support is followed by a chemical treatment step of said active layer.

13. The method according to claim 8, successively comprising:
   a fabrication step of a first electrode, the free surface of the support designed to receive the active layer of the first electrode being formed by a free face of the additional layer,
   a vacuum deposition step of an electrolytic membrane on the free surface of the active layer of the first electrode,
   and a fabrication step of a second electrode, the surface of the support designed to receive the active layer of the second electrode being formed by the free surface of the electrolytic membrane.

14. The method according to claim 13, wherein the respective catalysts of the catalytic layers of the first and second electrodes are identical.

15. The method according to claim 13, wherein the respective polymers of the porous layers of the first and second electrodes are identical.

16. The method according to claim 15, wherein the electrolytic membrane is formed by a non-porous thin layer comprising a hydroxide ion conducting polymer identical to the polymer of the porous layers of the first and second electrodes.

* * * * *